(12) United States Patent
Mombelli

(10) Patent No.: US 6,364,335 B1
(45) Date of Patent: Apr. 2, 2002

(54) FOLDING BICYCLE TO LIE WITHIN THE BULK OF ITS WHEELS LAID SIDE BY SIDE

(76) Inventor: Francesco Mombelli, Via Calabria 9, 20052 Monza (MI) (IT)

( * ) Notice: Subject to any disclaimer, the term of this patent is extended or adjusted under 35 U.S.C. 154(b) by 0 days.

(21) Appl. No.: 09/646,625

(22) PCT Filed: May 6, 1998

(86) PCT No.: PCT/IT98/00113

§ 371 Date: Sep. 20, 2000

§ 102(e) Date: Sep. 20, 2000

(87) PCT Pub. No.: WO99/51485

PCT Pub. Date: Oct. 14, 1999

(30) Foreign Application Priority Data

Apr. 2, 1998 (IT) ......................................... MI98A0707

(51) Int. Cl.[7] .............................................. B62K 15/00
(52) U.S. Cl. ...................................... 280/287; 280/278
(58) Field of Search ................................ 280/287, 278, 280/281.1

(56) References Cited

U.S. PATENT DOCUMENTS

| | | | | |
|---|---|---|---|---|
| 3,990,717 A | | 11/1976 | Best | |
| 4,182,522 A | * | 1/1980 | Ritchie | 280/287 |
| 4,462,606 A | * | 7/1984 | Hon | 280/287 |
| 5,193,834 A | * | 3/1993 | Strozyk | 280/287 |
| 6,196,566 B1 | * | 3/2001 | Zhang | 280/287 |

FOREIGN PATENT DOCUMENTS

| | | |
|---|---|---|
| EP | 0 565 760 A | 10/1993 |
| GB | 2 021 055 A | 11/1979 |

* cited by examiner

*Primary Examiner*—Kevin Hurley
(74) *Attorney, Agent, or Firm*—Michael J. Striker

(57) ABSTRACT

Folding bicycle (10), whose gear with pedal unit (110) and rear wheel (12) can, by means of articulation and locking devices (25, 45, 105) be brought up to the upper part of the frame (20), the handlebar (60) be moved downwards, the steering column (50) with handlebar rod (63) pressed into it, be moved against the front wheel (11), the group comprising, side by side, the front wheel (11), and column (50) of the handlebar, be moved against the rear wheel (12) and pedal unit (110), a tie rod (107) supporting the saddle (13) be moved inside an upper tubular extension (23') of the frame (20), the tube (100), with the tie rod of the saddle (13) pressed into it, be rotated towards the frame (20), the pin of the left pedal be rotated until it lies beside said group, reducing the overall bulk of the bicycle (10) substantially to the dimensions of the two wheels (11, 12) when placed side by side.

16 Claims, 9 Drawing Sheets

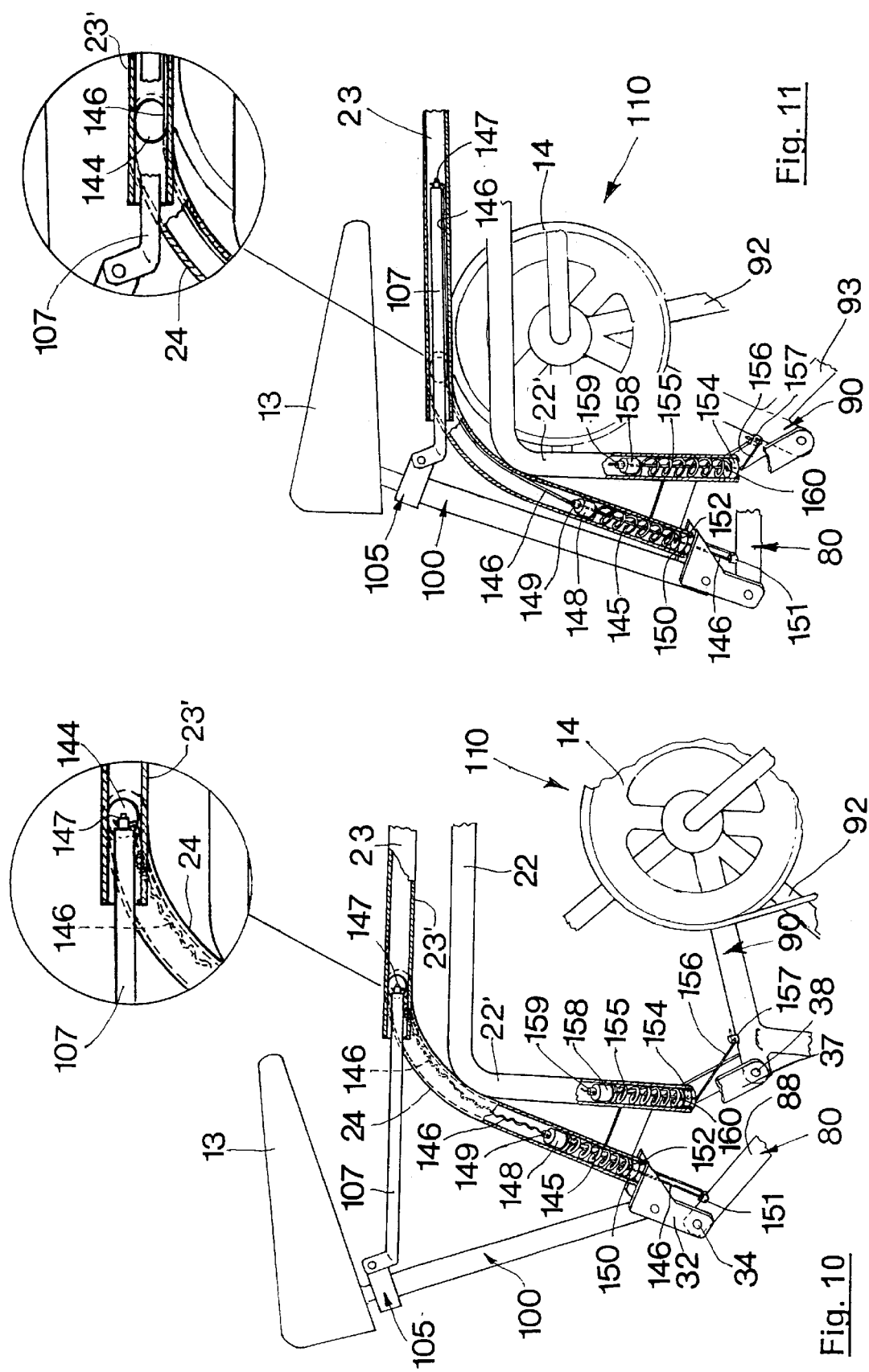

Figure 1:
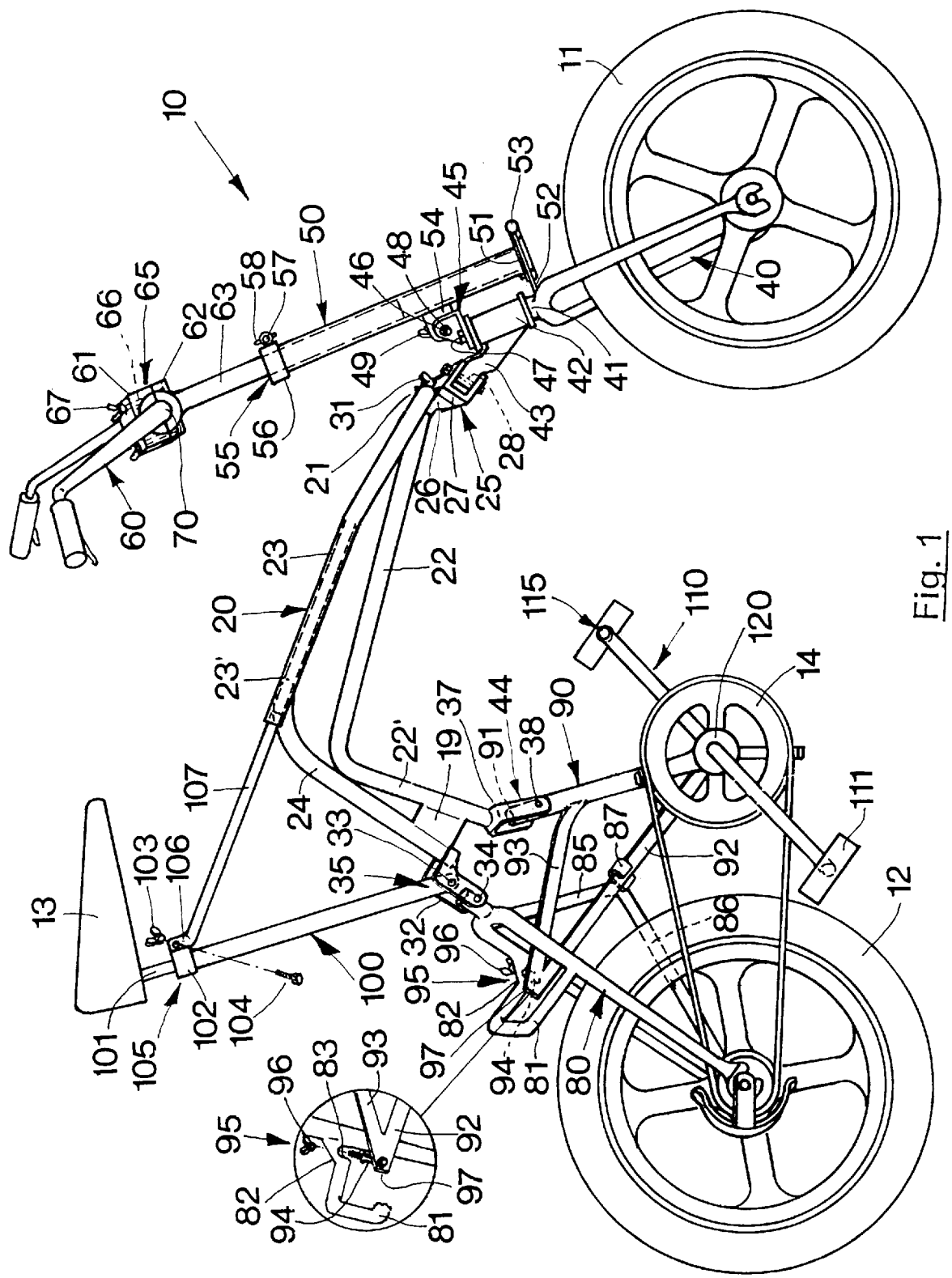

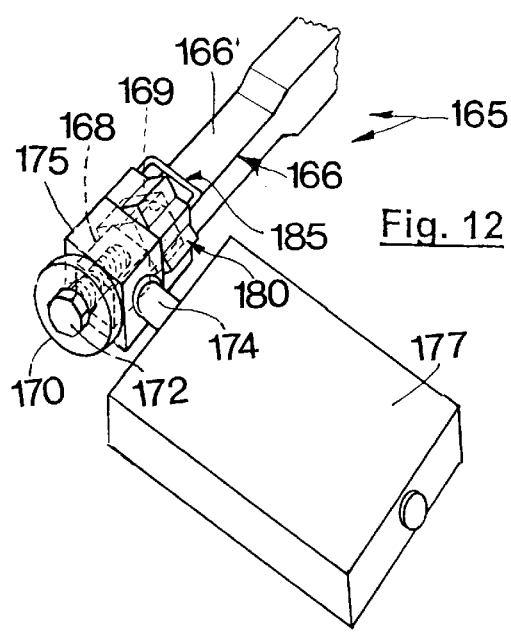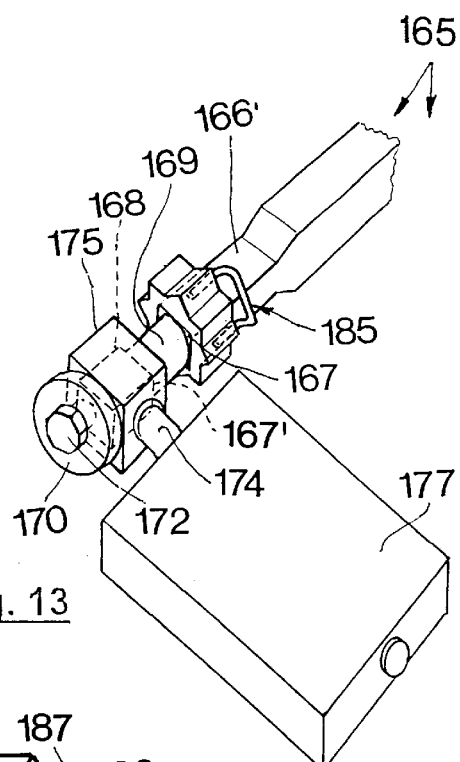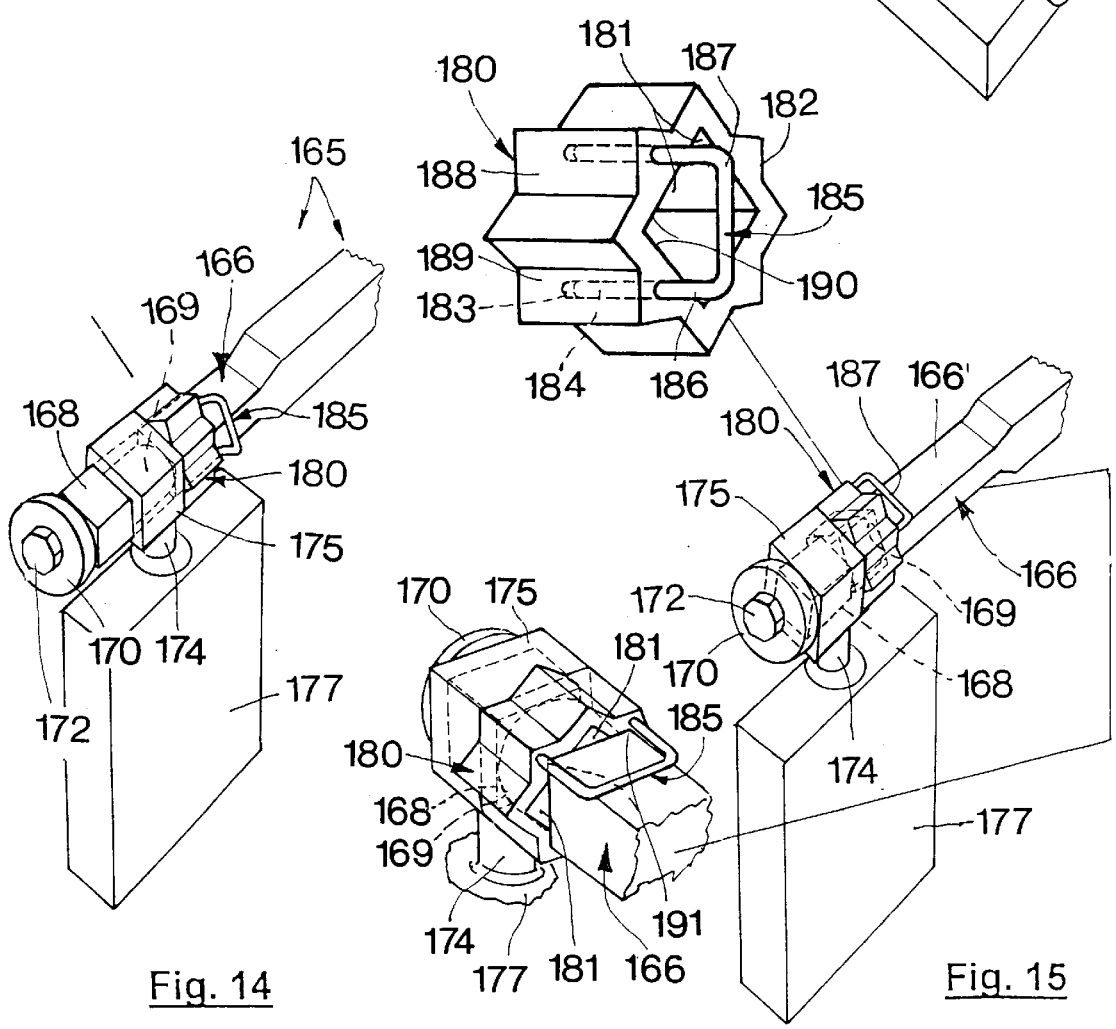
Fig. 12
Fig. 13
Fig. 14
Fig. 15

FOLDING BICYCLE TO LIE WITHIN THE BULK OF ITS WHEELS LAID SIDE BY SIDE

The invention concerns bicycles.

There are several well known brands of folding bicycles on the market.

These brands are roughly speaking folded by dividing their rigid and more bulky parts such as the frame, forks and handlebar into one or more units which are then superimposed by means of articulations.

This method however includes a number of drawbacks.

The bicycle so folded is always too bulky, the operations of folding it for transport and opening it out for use are complex and the ultimate effect causes wear on basic parts such as the frame, forks and handlebar.

The prior reference EP 0 565 760 discloses a collapsible bicycle in which the rear wheel is supported by a three-fork triangular structure, rotatable on the axis of the pedal unit and fixed, when ready for use, to the top of the frame comprising two sharply arched longitudinal tubes.

When said rotatable structure is detached from the frame, the rear wheel can be placed underneath in contact with the frame.

It is thus clear that the bulk of the folded bicycle remains considerable and in practice does not solve the problems that such a bulk creates.

The prior reference U.S. Pat. No. 3,990,717 makes it possible to superimpose the two wheels, chosen for their limited size, making use of a substantially square frame, there being double joints at the four corners so that the four sections of the frame can be placed over one wheel and the second wheel over that one.

When the bicycle is ready for use the frame is kept rigid by a set of tie rods.

Clearly, reducing the bulk to substantially that of the two superimposed wheels is a complex operation and also means that the structure of the bicycle consists of a large number of parts.

In conclusion, this bicycle is very expensive and its conversion from the form for transport to that of use is necessarily a complex matter.

The above invention discloses a method for quickly folding the essential components in a bulk equivalent to that of the wheels laid side by side so that the bicycle in this compact form can be stowed in the boot of a car and opened up for use when required as will be explained below.

Subject of the invention is a bicycle that can be folded for transport so as to occupy approximately the bulk of its wheels laid side by side.

Here follows a description of the main characteristics needed to obtain this result.

At the upper end of the rear fork is an articulation, corresponding to the lower ends of the frame, with its axis parallel to that of the rear wheel, that enables the rear wheel to be brought up to the top of the frame.

The pedal unit with gear is supported above by a tubular bar at whose upper end is an articulation, on one lower end of the frame, the axis of which is parallel to that of the pedal unit, permitting the gear to be brought up to the top of the frame.

The bar of the pedal unit can be associated to the rear fork by a hand-operated locking device placed at the top of a sort of locking triangle formed of the conjunction of two short bars, at an angle one from another, that depart from the upper and lower sides of the pedal unit ensuring stability of the rear fork and of the pedal unit when the bicycle is opened out for use.

The handlebar, shaped like an upward-facing U, is fixed to a rod that can be joined to the front fork, by means of a manually-operated locking device, permitting the handlebar to rotate on an axis orthogonal to said rod, the handgrips then facing downward roughly coplanar with said rod.

The front fork is supported by an upper rod freely turning inside a tube fixed to the forward end of the frame.

The handlebar rod slides inside a steering column at whose upper end is a hand-operated locking device fixed to the fork of the front wheel, above it by means of a lateral hinge lying on a geometrical plane transversal to the upper rotation rod of said fork and lying at approximately 45° to the longitudinal plane of symmetry of the front wheel, and sideways by means of a locking device placed at the top of said fork's upper rod.

The tube supporting the front fork's upper rod is fixed by a bracket to the front of the bicycle frame, by means of a joint, whose axis is substantially orthogonal to the rear wheel, and of a hand-operated locking device.

The saddle is supported by a rod that slides inside a tube, joined at the lower end of the frame by an articulation parallel to the rear wheel close to the articulation of the fork.

By means of a hand-operated articulation and locking device at the top of the tube, joined by a tie rod that slides inside a tubular extension of the frame, both saddle rod and tie rod can be locked in the desired position.

The pin of the left pedal is supported by a hand-operated locking device, at the end of the pedal crank, to permit rotation of said pin on an axis orthogonal to the pedal crank so that, when packed for transport, said crank is substantially parallel to the back wheel.

By releasing, in succession, the locking devices on the bicycle ready for riding, it can be prepared for transport by moving both gear and rear wheel to the upper part of the frame, turning down the handlebar, pressing the handlebar rod into its steering column, turning the column 45° round the hinge at the bottom against the front wheel, rotating the group comprising front wheel, front fork, handlebar column and handlebar itself against the back wheel and pedal unit, pushing the saddle rod into its tube and the saddle's tie rod inside the tubular extension of the frame then rotating said column towards the frame, turning the left pedal pin so that it is beside said group, by doing all this the bulk of the bicycle can be reduced to practically that of the two wheels when placed side by side.

In a preferred type of execution the frame is formed of a tube bent into a longitudinal fork, symmetrical in relation to the bicycle's vertical geometrical plane of symmetry and inclined towards the front wheel with a curved front section and two arms, the left arm extending downward to bend at about 90° inside the bicycle, and the right arm completed by an external lateral extension bent at about 90° towards the rear fork until the ends of said arms reach a coplanar position with a joining bridge lying on the bicycle's longitudinal geometrical plane, both slightly diverging.

Rear fork and pedal unit articulations are placed respectively at the ends of said left and right arms.

On the left arm of the rear wheel's fork there is preferably a triangular extension substantially fixed to the upper and lower ends of the fork, said extension facing inside the bicycle, with a U-bolt on the downward facing end, amplitude corresponding to the lower bar of the locking triangle that comprises the pedal unit.

The locking device of the pedal unit and rear fork consists of a pin mounted orthogonally in the top of said locking triangle, that penetrates inside the rear fork, and of a lug having in it a recess made at the connecting point of an extension of the rear fork facing away from the bicycle, in which recess said threaded pin can be pressed and locked by a wing nut after insertion of the lower bar of the locking triangle inside said U-bolt.

The locking device for the handlebar consists of two half-bearings, one facing upward forming a semi-cylindrical slot equal to the diameter of the central crosspiece of the handlebar, fixed to the rod of said handlebar, and the other substantially the same, facing towards the first, both connected by screws through holes and fixed by wing nuts.

The locking device of the handlebar rod in the steering column consists of a halfring, fixed to said column, that can be tightened as required by a clamp comprising a transversal screw and a wing nut.

The locking device between the steering column and the rod of the front fork consists of a tongue fixed to the steering column at a certain distance from the lower hinge, that can be connected to a square fixed to the upper rod of said front fork by a screw and wing nut.

The locking and articulation device to fix the bracket of the front wheel fork tube onto the frame, consists of a small practically horizontal fork, facing towards the front wheel, having in it two parallel holes, one for articulation between said small fork and the bracket, and the other to take a screw, through a hole in said bracket, fixed by a wing nut to lock the device when the bicycle is in use.

The locking device for the tube into which the saddle's rod slides, consists of a half-ring with a perforated tongue and transversal screw with wing nut to tighten said half-ring and therefore lock said rod in the two positions, fully extended for riding and pushed into the tube for transport.

On this screw is a head placed at the end of the saddle's tie rod that slides into the tubular extension of one arm of the frame so that by locking said device, the position of the tie rod is locked, fully extended for riding or fully inside for transport, as rotation of the tube on its 'articulation at the lower end of the frame causes rotation of the perforated tongue on the locking device containing the screw with wing nut.

Locking this rotation therefore also locks the saddle's tie rod in position and consequently the tube as well.

The locking system for the pin of the pedal on the left pedal crank in the two positions, for riding and for transport, consists of a short bar fixed to said pin, said bar freely rotating longitudinally inside the pedal crank and controlled by a transversal pin, served by a spring, that can penetrate as required in one or other of the transversal holes in said bar corresponding respectively to the position of the pedal pin orthogonal to the pedal crank or on the same plane as the pedal crank.

The effect of this feature is to compress the volume of the bicycle, when folded for transport, substantially within a parallelepiped measuring cm 40×50×20, if wheel diameter is 40 cm, or else within a parallelepiped measuring cm 50×60× 20 if wheel diameter is 50 cm.

In one advantageous variant nearly all folding parts of the bicycle can be balanced.

According to this variant, inside the lateral extension of the right arm of the frame, there is a cylindrical helical compression spring resting on a base plate welded to the end of said extension, through which passes a metal wire hooked uppermost to an upper head of the spring and freely emerging below from a hole in said base plate, then hooking onto a clamp placed on one arm of the rear fork of the bicycle close to its articulation with the frame.

The spring is preloaded so as to assist in balancing the rear fork complete with rear wheel.

On leaving the head of the spring, the wire attached to it passes through the lateral hole that connects the right arm of the frame to its extension, and becomes attached to a clamp placed close to the tip of the saddle's tie bar so that when said tie bar is pressed inside the tubular expansion of the right arm of the frame, the wire becoming extended enters in synergy with the spring, assists in balancing the rear fork and ensures its stability in the folded position with the rear wheel mainly inside the frame.

A cylindrical helical compression spring is placed at the end of the left arm of the frame and makes contact with a plate welded at the end of said arm practically at the position of the articulation of the bar that supports the pedal unit and that has at its upper end a head with a clamp to which a metal wire is attached, said wire passing through the spring and freely emerging from a central hole in the plate after which it hooks onto a clamp placed on said bar supporting the pedal unit close to its articulation on the frame thus assisting balancing of the pedal unit together with its gear and chain.

Inside the handlebar rod is a cylindrical helical compression spring that makes contact uppermost with a plate welded substantially at the top end of said rod.

A metal wire fixed to a clamp on the spring's lower head passes through said spring and emerging freely from a central hole in the plate hooks onto the central crosspiece of the handlebar.

When the bicycle is folded up, rotation of the handlebar pulls on the wire and compresses the spring so counterbalancing tire handlebar's weight.

At the lower end of the handlebar's steering column is a cylindrical helical compression spring that makes contact substantially with the lower end of said column and therefore with the plate that connects the column with a hinge supported by a bracket fixed to the front fork of the bicycle and that uppermost has a head with clamp to which is attached a metal wire that, passing through the spring, freely emerges from a hole in said plate and becomes attached to a clamp substantially in the centre of said bracket.

Therefore, on folding up the bicycle for transport, the handlebar column is bent up against the front wheel, the helical spring becomes compressed when pulled by the wire so balancing the weight of the column with the handlebar.

The device placed at the end of the left pedal crank, to position the pedal orthogonal to the crank when in use, or on said crank's geometrical plane for transport, consists in a particular configuration of the end of the pedal crank comprising, outwards in succession, a length of constant square cross section, a collar, an end length of a constant square section and a locking washer mounted frontwise on the end of the pedal crank by a screw of a diameter greater than the cross section of the pedal crank.

Sides of the square section and collar diameter are substantially equal. At the end of the pedal pin is a head connecting with the pedal crank consisting of a squared ring whose internal dimensions are substantially the same as those of the end cross section of the pedal crank, permitting said head to slide freely on the ends of said crank.

A ring nut, placed on said end of the pedal crank, has a central hole in it of a constant square section the dimensions of which are substantially the same as those of the end of the pedal unit.

Placed diagonally in one corner of the hole in said ring nut is a U-shaped elastic metal fork whose arms are securely fixed to extensions made substantially in the centre of the sides forming the corner of the above hole, whose central part cuts through said corner.

The ring at the end of the pedal pin can therefore be placed on the square end of the pedal crank when the bicycle is in use, when the pin is orthogonal to the axis of the pedal crank and the ring nut at the position of the collar.

Spontaneous movement of the ring nut towards the internal square area of the pedal crank is however prevented because the fork placed diagonally to a corner of the hole in the ring nut moves spontaneously to one side of said end of the pedal crank causing the square hole in said ring nut to become displaced in relation to the square body of said end of the pedal crank.

The pedal consequently remains locked in the working position.

When it is desired to move the pedal for transport, the elastic fork can be pressed by hand to free the corner of the square hole in the fork and allow the ring nut to slide towards the inside of the pedal crank so that it coincides with the length of a square section.

In this way the ring on the pedal pin can pass to the position of the collar, rotating until it lies on the same geometrical plane as the pedal crank and sliding to the end of the square section of the pedal crank leaving the ring nut free to resume its position near the collar.

In that position the ring nut is free to rotate and, pressed by the elastic fork, the corners of its hole once more interfere with the sides of the square end of the pedal crank, so fixing the pedal in its transport position.

The invention offers evident advantages.

By moving a few locking devices, easily done by hand, the pedal unit and rear wheel can be quickly moved to the upper end of the frame, the handlebar made substantially coplanar with its steering column, said column bent against the front wheel and the whole complex, comprising said front wheel and the handlebar, bent onto the rear wheel and pedal unit, the pedals themselves having already been turned to become parallel with the rear wheel.

Bearing in mind that the frame practically consists of a longitudinal fork, the upper end of the rear wheel can be placed inside said fork.

The saddle bar can be pressed completely into its column and this latter be folded towards the frame of the bicycle so that the saddle is practically matching with the top of the frame.

It will be seen from-the above that, when folded up for transport, the total bulk of the bicycle can be comprised within the volume of a parallelepiped whose height and width are substantially that of wheel diameter.

If wheel diameter is 40 cm, total bulk is approximately cm, 40×50×20, while if wheel diameter is 50 cm, total bulk is about cm 50×60×20.

The ease of locking and releasing the devices and the security they offer when the bicycle is ridden, mean that the vehicle can be used with maximum comfort and satisfaction in any place suitable for bicycle riding.

The variant execution, in which nearly all the heavy parts of the bicycle such as the fork and back wheel, the pedal unit and gear, the handlebar and steering column, can be balanced by springs associated to metal wires inside the steering column and handlebar rod, greatly facilitates changing from the riding position to that for transport which becomes a simple and convenient operation avoiding for users all the effort generally connected with transforming a folded bicycle into one ready for use.

Compared with known types of folding bicycle, the one here invented presents exceptional compactness and a surprisingly easy changeover from one form to the other, offering greatly increased comfort to users who really can benefit from an extremely useful "accessory" for travelling over any type of ground, fully exploiting the features typical of bicycles even when the chosen area is reached by motor vehicles or other means.

Characteristics and purposes of the invention will become still clearer by the following examples of its execution illustrated by diagrammatically drawn figures.

FIG. 1 Side view of the bicycle ready for use with detail of the device for connecting the pedal unit to the rear fork.

Figure 2:
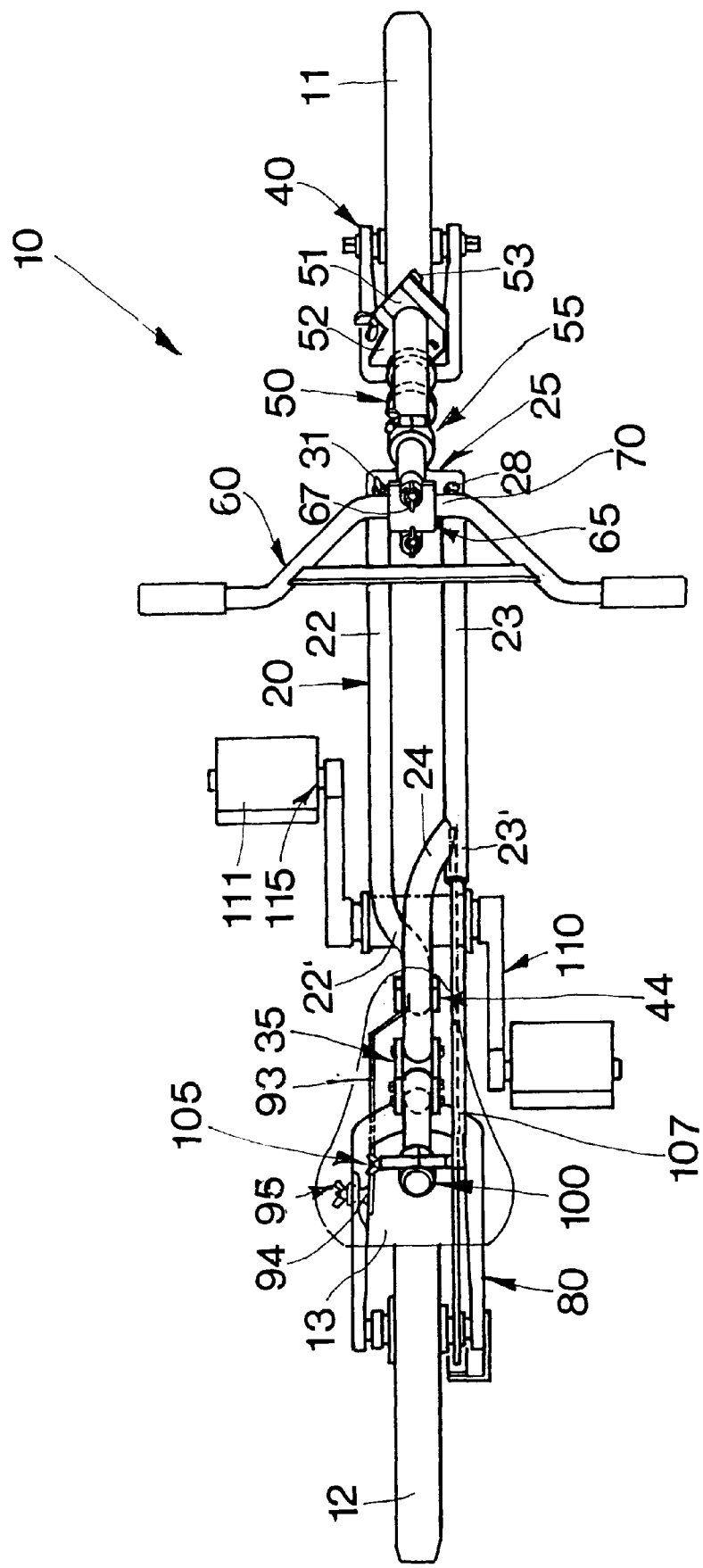

FIG. 2 As FIG. 1 seen from above.

Figure 3:
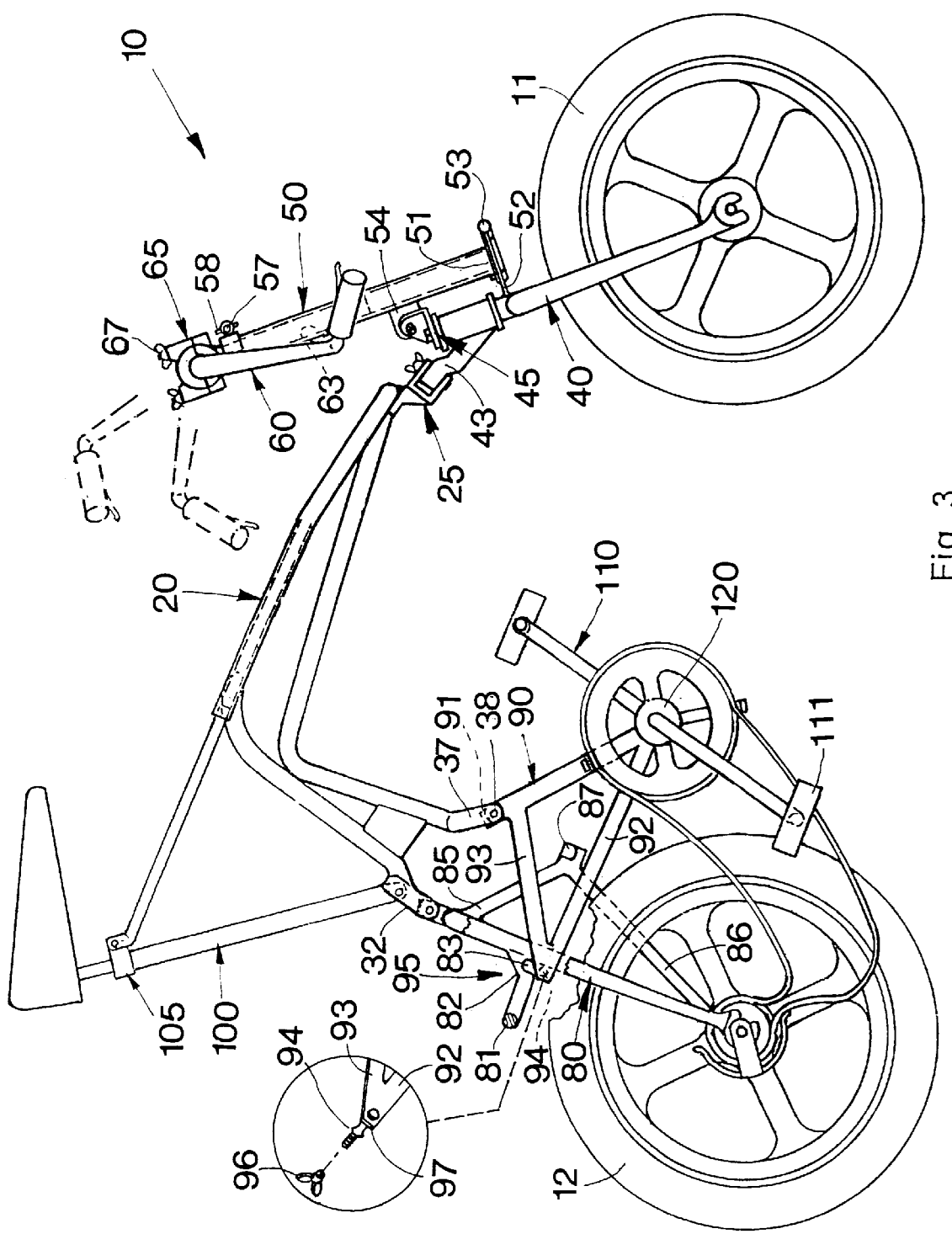

FIG. 3 The bicycle when moving the back wheel and pedal unit towards the frame after the handlebar has been turned round its central cross-piece and pushed into the tube that enters the steering column connecting it to the front fork; side view.

Figure 4:
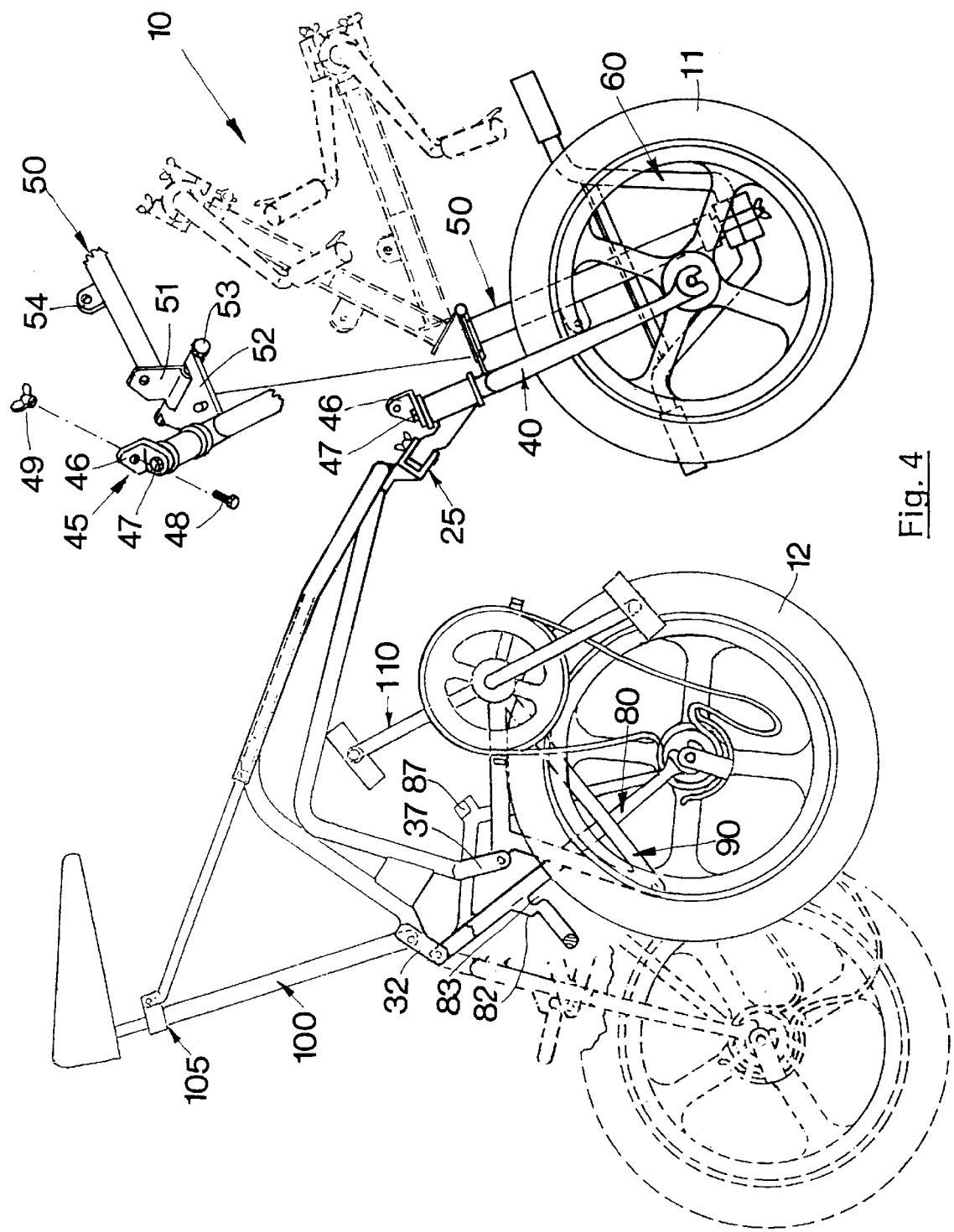

FIG. 4 The bicycle during translation of the back wheel and pedal unit towards the frame and when the handlebar's steering column has been bent against the left side of the front wheel; side view.

Figure 5:
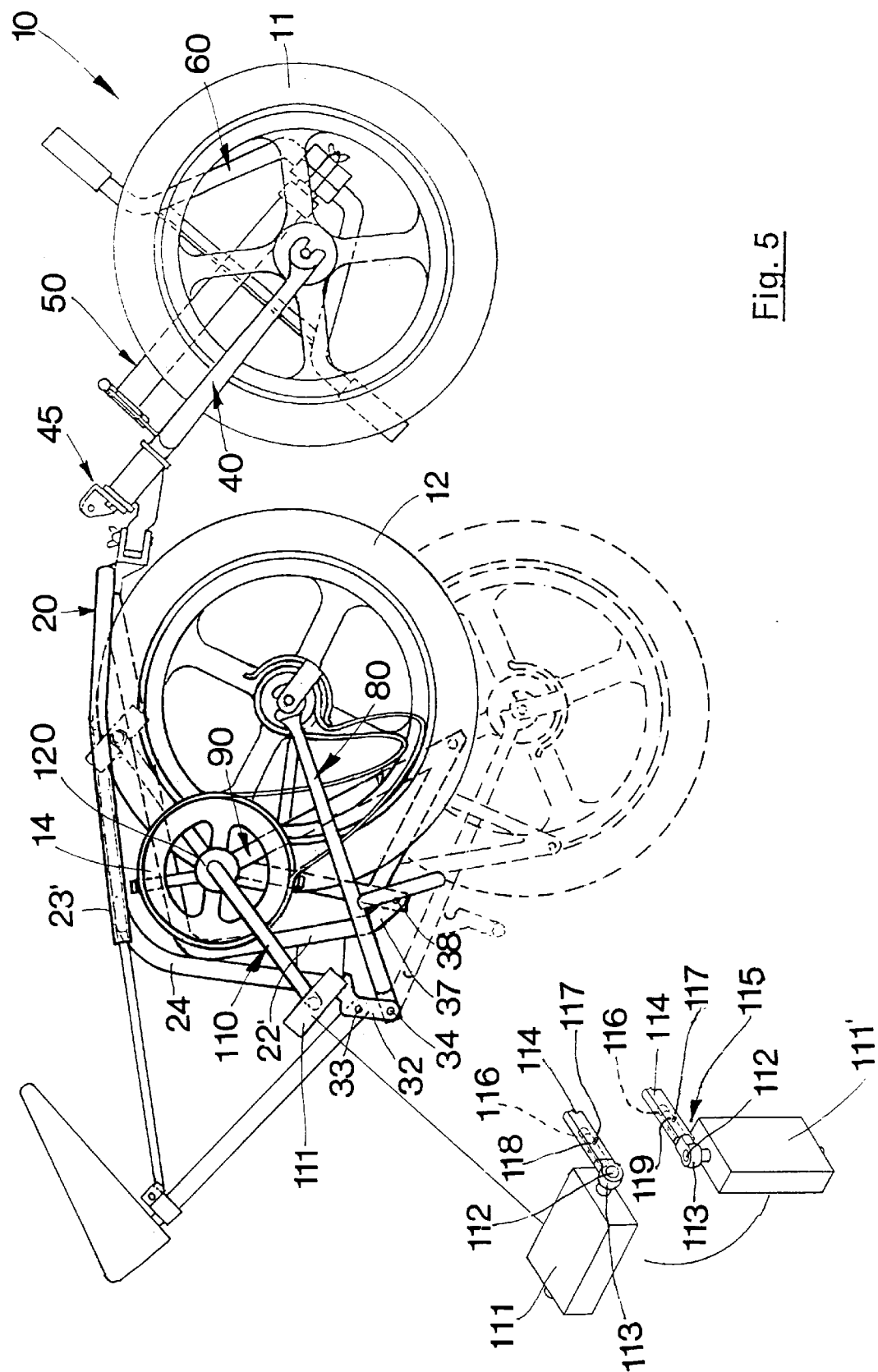

FIG. 5 Side view of the bicycle when the back wheel and pedal unit have been moved towards the central frame, with detail of the joint between pedal crank and one pedal to bend them against the body of the bicycle, in two positions, perspective.

Figure 6:
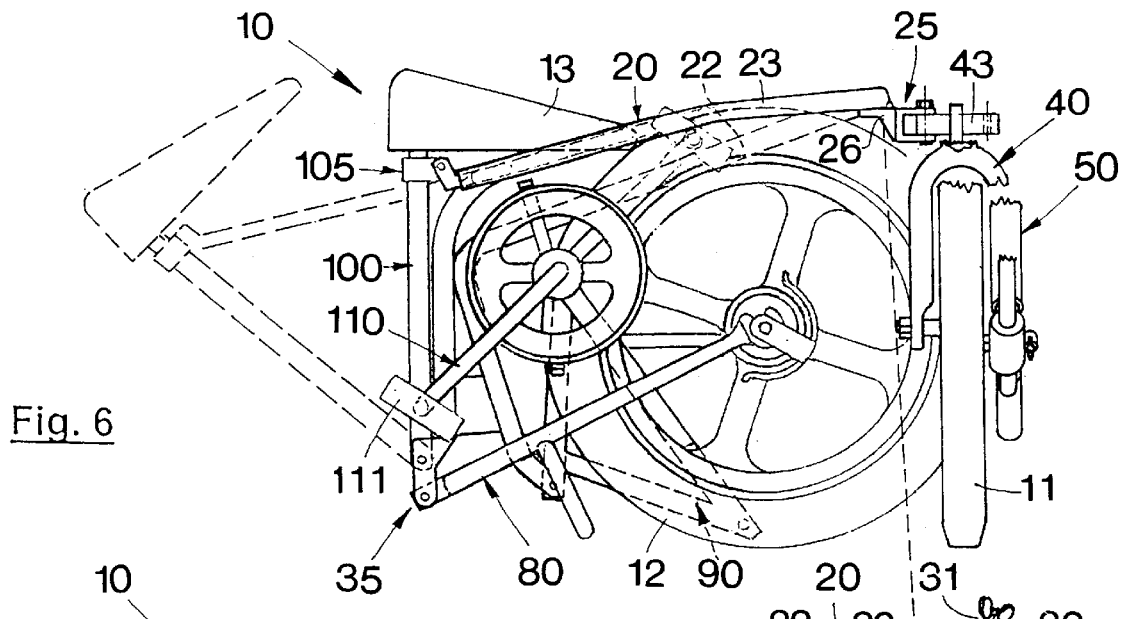

FIG. 6 Side view of the bicycle in FIG. 5 when the front fork is being bent onto the rear wheel, with detail showing plan view of the fork's articulation in relation to the frame.

Figure 7:
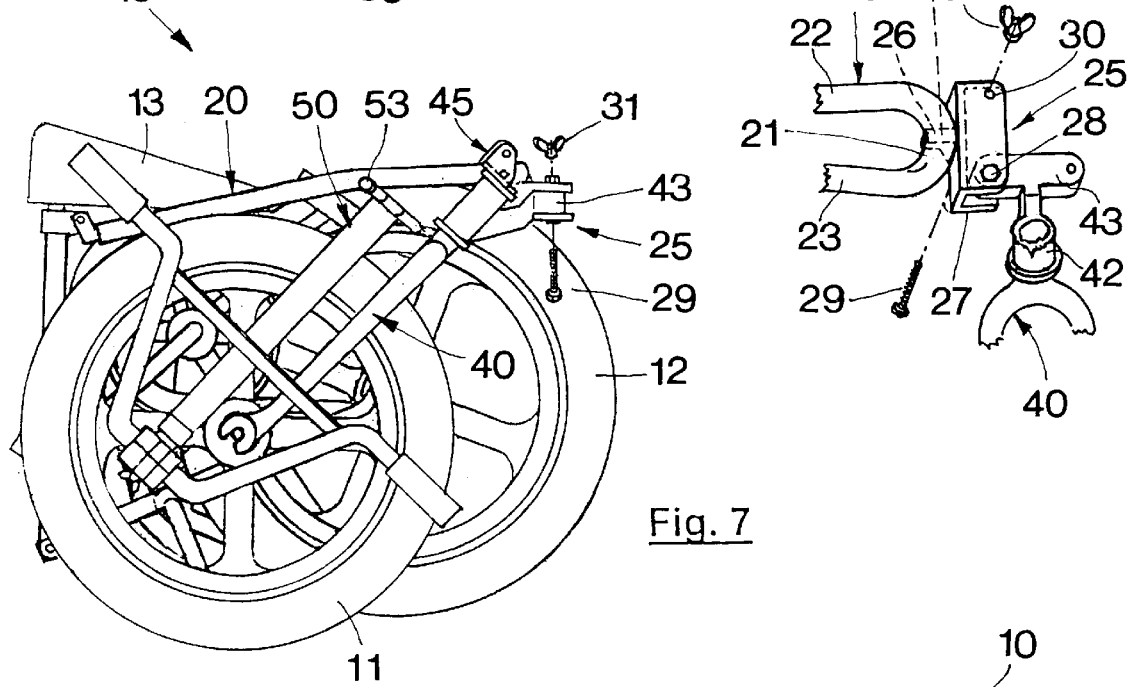

FIG. 7 Side view of the bicycle in FIG. 6 when the front fork has been bent against the rear wheel and pedal unit.

Figure 8:
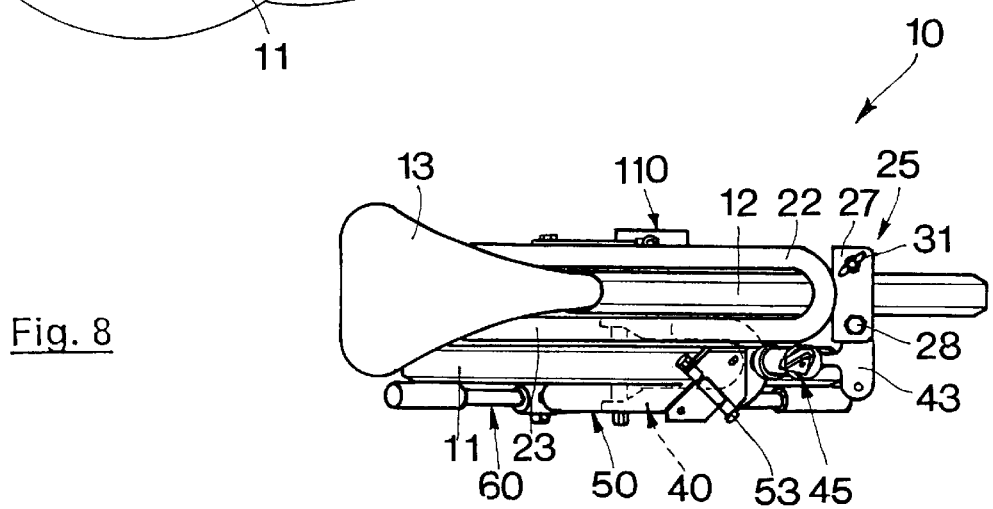

FIG. 8 View of FIG. 7 seen from above.

Figure 9:
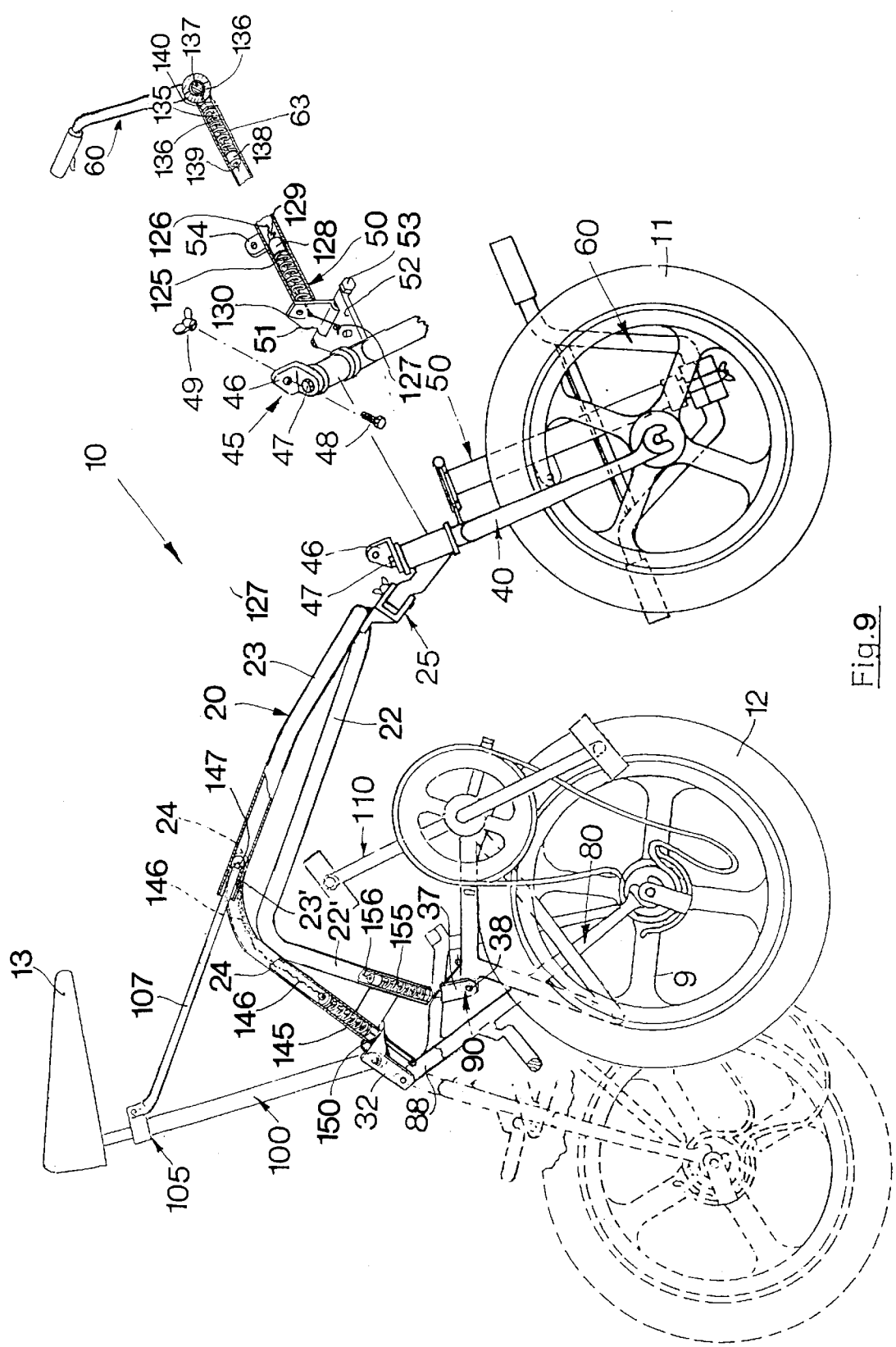

FIG. 9 Variant execution of the bicycle with folding parts balanced, as seen in FIG. 4, side view cut away with detail of the steering column and handle-bar rod.

FIG. 10 Detail of the rear part of the frame, as in FIG. 9, side view with further detail, cut away, of the end of the frame's right arm.

FIG. 11 Detail of FIG. 10 after folding the saddle, side view, with further detail, cut away, of the end of the frame's right arm.

FIG. 12 Variant execution of the joint between left pedal and pedal crank to permit rotation, when in use, of the pedal pin on the geometrical plane of the crank, using a translating locking ring nut, perspective from above.

FIG. 13 As above, after axially moving the ring nut to permit translation of the pedal pin on the pedal crank.

FIG. 14 As above after rotation of the pedal pin round the pedal crank as far as its geometrical plane.

FIG. 15 As above after returning the ring nut to lock the pedal pin, with detail of the ring nut and of the pedal crank end oriented at 90°.

The bicycle 10 comprises the frame 20, the front fork 40, the steering column 50 of the handlebar, the rear fork 80, the tubular bar 90 for supporting the pedal unit 110 and the tube 100 for the saddle.

The frame 20 is formed of a tube bent into a longitudinal fork with a curved front 21 (see also detail in FIG. 6) and two arms, the left 22 and the right 23, substantially laid on two vertical parallel geometrical planes.

Arm 23 terminates in a tubular end 23'.

Arm 23 continues in an extension 24 that starting from its left side, makes a downward curve of about 90°.

The end 22' of arm 22 makes a downward curve of about 90° towards the bicycle's longitudinal plane of symmetry.

At their ends, the extension 24 of arm 23 and the extension 22' of arm 22 assume a substantially coplanar position slightly diverging downwards and being joined by a coplanar bridge 19.

An articulating and locking device 25 with bracket 26 is placed at the front end 21 of the fork-shaped frame (FIGS.

1 and 7), said device consisting of the broad substantially horizontal small fork 27 facing towards the front of the bicycle, presenting an articulation 28 with a fixed screw as a support 43 for the tube 42 enclosing the rod 41 on the bicycle's front fork 40.

Said articulation is locked by a mobile screw 29 that passes through a hole 30 and is fixed by a wing screw 31.

Fixed to the arm 23 formed of the extension 24 is an articulating device 35 comprising a small vertical fork 32 facing rearwards, that presents an articulation 33 for the tube 100 receiving the rod 101 of the saddle 13, and a lower articulation 34 for the top of the fork 80 of the bicycle's rear wheel 12.

At the end 22' of arm 22 is an articulating device 44 comprising a small substantially vertical fork 37 facing downwards with an articulation 38 for the tubular bar 90 that supports the pedal unit 110.

Placed at the base of the upper rod 41 of the front fork 40, that rotates round the tube 42, is a bracket 52 connected by articulation 53 to a plate 51 fixed to the base of the steering column 50 of the handlebar 60.

A square 46 is fixed by a screw 47 to the top of said rod 41.

About halfway up on the steering column 50 is a lateral tongue 54 that fixes said column to said square 46 by a screw 48 and wing nut 49.

At the top of said steering column 50 is a clamp 55 comprising a half ring 56 with screw 57 and wing nut 58; these permit telescopic insertion of the rod 63 carrying the handlebar 60 by means of the clamp 65 comprising half bearings 61 and 62 with screws 66 tightened by wing nuts 67.

The tubular bar 90 carrying the pedal unit 110 turns uppermost in articulation 38 on the end 22' of the arm 22 of the frame 20, and is fixed at the bottom to the hub 120 of said pedal unit 110.

A flat bar 92 leaves said hub at an acute angle in relation to the tubular bar 90, substantially orthogonal to fork 80 when the bicycle is in use.

The free end of said bar 92 is connected to bar 90 by a second bar 93, at an acute angle in relation to bar 92, close to articulation 38 and together forming a kind of small triangular frame.

The left end 97 of said small frame is substantially within the rear fork 80 and presents a locking device 95 comprising a fixed orthogonal threaded pin 94 whose dimensions correspond to those of the recess 83 in ear 82 in the rear U-shaped extension 81 of the fork 80, to which said small frame is fixed by tightening the wing nut 96 on said pin 94.

Fixed to the upper and lower ends of the left arm of fork 80 are the ends of an angular extension composed of two shorter bars 85, 86 at whose apex is a downward facing U-bolt 87.

Internal amplitude of U-bar 87 is substantially that of the thickness of bar 92 fixed to the tubular bar 90.

At the upper end of the tube 100 that receives rod 101 supporting the saddle is a clamp 105 formed of a cut ring 102 that can be tightened by a transversal screw with wing nut 103.

Fixed to the head of said screw is a tongue-shaped end 106 of the tie rod 107 that penetrates inside the tubular end 23' of arm 23 of frame 20.

The pedal unit 110 (see detail in FIG. 5) comprises the hub 120, the gear 14, pedals 111, pedal pins 112 supported atone end by the heads 113 fixed to longitudinal bars 116 turning freely inside pedal arms 114.

A locking pin 117, roughly shown in the figures, can be pressed by the fingers in one 118 or another 119 of the seats at 90° made crosswise in the bar 116, the effect of this being to lock the pedals either in the riding position 111 of the bicycle or in its transport position 111' substantially comprised in the same geometrical plane of the arms 114.

The pedals can thus be comprised within the bulk of the bicycle when folded for transport, facilitating superimposition of the front wheel 11 (FIGS. 7 and 8).

It will be seen from the foregoing that to transform the bicycle from its riding position in FIGS. 1 and 2 into that for transport FIGS. 7 and 8 and to stabilise both positions, it is merely required to follow the order of FIGS. 1 to 8 operating the articulation and locking devices described, as explained below:

- device 65 for locking rotation of the handlebar 60 round its central cross piece 70 on the rod 63;
- locking device 55 for the handlebar's rod 63, sliding it inside the handlebar's steering column 50;
- locking device 45 for folding the column 50 round articulation 53 on the front wheel 11;
- locking device 95 for rotation of the small frame 92–93 fixed to the tubular bar 90 of the pedal unit, onto articulation 38, and of rear fork 80 in articulation 34, towards the frame 20 until the upper end of the gear 14 and of the rear wheel 12 substantially match with the top of frame 20.
- device 25 for locking and articulation of the group consisting of the rear wheel 40, of the handle bar and its rod to match with the first, against the rear wheel;
- locking and articulation device 105 for lowering the saddle rod 101 into the tube 100 and for inserting the saddle's tie rod 107 inside arm 23' of tube 20 said tube 100 rotating in articulation 33 of articulating device 35 at the end of extension 24 of arm 23 of the frame;
- locking and articulation devices 115,180 for rotation of pedal pins in relation to the pedal cranks round the bars turning longitudinally in the arms of the pedal unit.

FIGS. 9–11 show a variant execution for balancing the folding parts. Inside extension 24 of the right arm of the frame 20, a helical cylindrical compression spring is inserted making contact below with the base 150 of said extension, and having at its upper end a head 148 to which the clamp 149 fixes a wire 146 that passes inside the spring and emerges from the central hole 152 in said base; said wire is joined to clamp 151 placed on the arm 88 of the rear fork 80, close to said fork's articulation 34, on the small fork 32 of said extension 24 to the right arm 23 of the frame.

An extension of the wire 146 emerges from the head 148 and, continuing inside the tubular extension 24, connects above, through the hole 144 at the junction between extension 24 and the right arm 23 of the frame, to the tip of the saddle's tie rod 107 at the position of clamp 147.

The length of wire 146 from the head 148 to its connection with the saddle's tie rod 107, is longer than the distance between said points of connection and, therefore, when the bicycle is prepared for riding, said wire is loosened.

As will be seen in FIG. 11, the strength of the spring 145 is sufficient to balance the weight of the rear fork 80 with its wheel 12 (FIG. 9).

On inserting the saddle's tie rod 107 into the arm 23 of the frame, (FIG. 11), when said tie rod is more or less fully extended, the wire 146 will lie below it and, acting in synergy with the spring 145, causes the rear fork, and therefore the rear wheel, to bend over completely against the frame 20, in the position seen in FIG. 5.

The pedal unit 110, that turns in the articulation 38 formed by the small fork 37 at the tubular end 22' of arm 22 of the frame 20, is balanced by the cylindrical helical compression spring 155 (FIGS. 9–11) that makes contact below with the plate 154 welded at the tip of said end 22'.

At the top of said spring 155 is a head 158 with clamp 159 to hold a metal wire 156 that, passing through the spring, emerges from the central hole 160 in said plate and is fixed to the clamp 157 on the bar 91 of the pedal unit 110 close to articulation 38.

As will be seen in FIG. 11, distension of the spring 155 contributes to raising the pedal unit 110 with gear 14 and to holding it against the upper bar 23 of the frame 20.

The handlebar 60 (detail in FIG. 9) is balanced by the helical compression spring 135 inserted in the tubular bar 63 of said handlebar.

Said spring makes contact with the plate 140 welded at the upper end of the bar 63, and is pulled by the wire 136 connected to the clamp 139 on the head 138.

The other end of the wire is hooked onto the hole 137 in the central part 141 of the handlebar so that when this latter turns from its position of use (FIG. 1) to that for transport (FIG. 9), said end of the wire rolls round said central part of the handlebar, pulling the head 138 compressing the spring, and balancing its weight until the position in FIG. 3 is reached. The steering column 50 with handlebar 60 is balanced by a spring 125 that makes contact with the plate 51 that turns on the bracket 52 (see detail in FIG. 9).

At the other end of the spring is a head 128 to which the wire 126 is fixed by the clamp 129, said wire passing through the spring emerges from the hole 130 in the plate 51 becoming fixed to clamp 127 of the bracket 52.

Therefore when the handlebar's steering column is turned to the position in FIG. 9, the spring 125 is compressed (see detail in FIGS. 4 and 9). FIGS. 12–15 show a variant of the left pedal crank 165 with pedal 177.

The arm 166 of the pedal crank has a constant square section interrupted by a collar 169, of a round section, forming a tip 168.

At the end of the pedal pin 174 is a square ring 175 of a width substantially equal to that of the tip 168 of the pedal crank arm on which it is fitted, locked by a washer 170 screwed onto the front of said tip of the arm 166 by a screw 172.

Applied to the arm of the pedal crank comprising three areas: 169 of a round section, 166 and 168 of a square section, is an annular ring nut 180 with a square hole 181 in it.

Dimensions of the sides of pedal crank arm 166, of the end 168 of said arm, of the diameter of collar 169 and of the square hole in the ring 175 of the pedal pin 174 are substantially equal so that the pedal ring 175 and that of the ring nut 180 can slide freely on the pedal crank arm 166 including the round section area 169 and the square section area 168.

At the four sides of the ring nut and on the same axis are the right-angled and respectively symmetrical projections 182.

Substantially corresponding to the axis of symmetry of one pair of said projections, 188 and 189, are holes 183 to receive the ends 184 of a fork 185 of harmonic steel wire that remain fixed in said holes while its arms 186 remain free outside.

The central part 187 of said fork lies diagonally to the square hole 181 in the ring nut partially covering one corner 190 of the hole.

The length of the square end 168 of the pedal crank arm, of the collar 169 and of the square ring 175 in the pedal pin, are substantially equal so that said ring 175 and the ring nut can rotate freely round the collar 169 of the pedal crank arm.

It will be seen from the above that, when the ring nut 180 is placed at the position of the collar 169 (FIG. 12), the pedal pin ring is obliged to remain on the end 168 of the pedal crank arm.

Said ring nut in turn is obliged to remain fixed in the position seen in FIG. 12 by the fork 185 that moves up against one side, such as 166' of the pedal crank arm 166, maintaining the position of said ring nut so that the corners 190 of its hole 181 are out of line with the edges 191 of the pedal crank arm 166 and practically in the centre of sides, such as 166, of said pedal crank's arm (see also detail in FIG. 15).

The position of the pedal in FIG. 12 corresponds to that of the pedal unit when in use.

To permit rotation of the pedal 177, when the bicycle is folded, so that it tends to coincide with the same geometrical plane as that of the pedal crank, the ring nut 180 must be forced to rotate in such a way that the upper edge 187 of the fork 185, becomes deformed to permit alignment of the square hole 181 of the ring nut with the square arm 166 of the pedal crank, therefore enabling said ring nut 180 to slide leaving the collar 169 (FIG. 13) free.

In this way the ring 175 of the pedal pin can be made to translate until it coincides with the collar 169 and then rotate said pin so that the pedal 177 moves to lie on the same geometrical plane as that of the pedal crank 165 (FIG. 14).

Therefore by once more moving said ring 175 onto the end 168 of the pedal crank and returning the ring nut 180 to the position of the collar 168, the pedal 177 can be locked in its folded position (FIG. 15).

The ring nut is once again locked by resumption of interference between the corners 190 of its square hole 181 and the sides 166' of the pedal crank arm 166 due to said square hole 181 of the ring nut 180 being out of line with the square section of said arm 166 of the pedal crank (FIG. 15).

This also means that the pedal is locked in place when the bicycle is folded up.

What is claimed is:

1. A bicycle (10) whose bulk when folded for transport is substantially that of two wheels (11, 12) placed side by side, wherein: at an upper end of a rear fork (80) is an articulation (34), at a lower end of a frame (20) with its axis parallel to that of a rear wheel (12) that permits the rear wheel to bent up to a top of the frame (20); a pedal unit (110) with a gear (14) is supported uppermost by a tubular bar (90) and whose upper end is an articulation (38) placed at one lower end (22') of the frame (20) with its axis parallel to that of the pedal unit (110) that permits the gear (14) to be bent up to the top of a frame part (20); a bar (90) of the pedal unit (110) can be anchored to the rear fork (80) by a hand-operated locking device (95) placed at an apex of a locking triangle formed of a junction between short bars (92, 93) at an angle to one another, that departs from lower and upper position of the bar (90) providing stability of the rear fork (80) and the pedal unit (110) when the bicycle (10) is open out for use; a handle bar (60) shaped as an upward facing (U) is mounted on a rod (63) that can be fixed to the front fork (40) by a hand-operated locking device (65) that permits rotation of the handle bar (60) on an axis orthogonal to the rod (63) until hand grips face downwards and are substantially coplanar with the rod (63), the front fork (40) is supported by a rod (41) freely turning above inside a tube (42) fixed to a front (21) of the frame (20); the rod (63) carrying the handle bar (60) slides inside a steering column (50), at whose upper end is a hand-operated locking device (55), said column being fixed to the fork (40) on the front wheel (11) above by a lateral hinge (53) on a geometrical plane transverse to an upper rod (51) for rotating the fork (40) and oriented substantially at 45° in relation to a longitudinal geometrical plane of symmetry of the front wheel (11) and laterally by a locking device (45) placed at a top of the upper rod (41) of the fork (40); the tube (42) that supports the upper rod (41) of the fork (40) is fixed to the front (21) by a bracket (43) and by an articulation (28), whose axis is substantially orthogonal to that of the rear wheel (12), on a hand-operated articulating and locking device (25); a saddle (13) is supported by a rod (101) that slides into a tube (100) joined at one lower end (24) of the frame (20) by an articulation (33) whose axis is parallel to that of the rear wheel (12) near the articulation (34) of the fork (80); by a hand-operated articulation and locking device (105), at a top of the tube (100) joined to a tie rod (107) that slides inside an upper tubular extension (23') of the frame (20), a sliding movement of the rod (101) of the saddle (13) and of the tie rod (107) can be stopped and both parts locked in a desired position; a pin (112) in a left pedal (111) is supported by a hand-operated locking device (15) at an end of a pedal crank (114) that permits rotation of the pin (112) around a longitudinal axis of the pedal crank (114) till it is substantially parallel to the rearwheel (12) when the bicycle (10) is folded for transport; it is thus possible when the bicycle is open for use, to release the locking devices (65, 55, 45, 95, 25, 105, 115) one after the other and transform the bicycle (10) into its folded position for transport, bringing both the gear (14) and the rear wheel (12) to an upper part of the frame (20), rotating the handlebar (60) downwards, pushing the rod (63) of the handlebar (60) inside the steering column (50), turning the column (50) around the bottom hinge (53) at 45° against the front wheel (11), rotating a group comprising, side-by-side the front wheel (11), the front fork (40), the column (50) with the handle bar (60) against the rear wheel (12) and the pedal unit (110) inserting the rod (101) supporting the saddle (13) inside the tube (100) and the tie rod (107) of the saddle (13) inside the tubular extension (23') of the frame with rotation of the tube (100) toward the frame (20), rotating the pin (112) in the left pedal (111) until it lies substantially against the group, thus reducing an overall bulk of the bicycle (10) so that it substantially corresponds to the dimensions of the two wheels (11, 12) placed side-by-side.

2. A bicycle as defined in claim 1, wherein the frame (20) is formed of a tubular bar bent into a longitudinal fork symmetrical to a vertical geometrical plane of symmetry of the bicycle (10) and inclined toward the front wheel (11) with the curved front section (21) and two arms, the left arm (22, 22') being extended downwards and towards an inside of the bicycle (10) bending at substantially 90° and the right arm (23, 23') being completed by the external lateral extension (24) bent at substantially 90° toward the rear fork (80) until ends (22', 24) of the arms (22, 22', 23, 23', 24) reach a coplanar position with a connecting bridge (19) lying on a longitudinal geometrical plane of the bicycle (10) making a slight reciprocal divergence, the articulations (34, 44) of a rear fork (32) and of the pedal unit (110) being respectively placed on ends of the right (23) and left (22') arms.

3. A bicycle as defined in claim 1, wherein on a left arm of the fork (80) of the rear wheel (12) of the bicycle (10) there is a triangular extension (85, 86) fixed substantially at upper and lower ends of the fork (80), facing inside the bicycle (10) fixed by a U-bolt (87) on a downward apex, of an amplitude corresponding to that of the lower short bar (92) of the locking triangle (92, 93) that penetrates inside the rear fork (80) and of an ear (82) with a recess (83) placed at a point of connection to an extension (81) of the rear fork (80) facing towards outside of the bicycle (10) in which recess (83) a threaded pin (94) can pass and be fixed by a wing nut (96) after the lower short bar (92) of the locking triangle (92, 93, 90) has been inserted inside the U-bolt (87).

4. A bicycle as defined in claim 1, wherein the locking device (65) for the handle bar (60) is formed of two half bearings (61, 62), with one of the bearings (62) facing upwards with a semi-cylindrical slot corresponding to a diameter of a central cross-piece (70) of the handlebar (60), fixed to the rod (63) of the handlebar (60) and the other half bearing (61) being substantially the same, facing the first half bearing (62) both connected by screws (66) through fixed by wing nuts (67).

5. A bicycle as defined in claim 1, wherein the device (55) for locking the rod (63) carrying the handle bar (60) on the column (50) consists of a half ring (56) fixed to the column (50) that can be tightened as desired by a clamp comprising a transverse screw (57) and a wing nut (58).

6. A bicycle as defined in claim 1, wherein the device (45) for locking the steering column (50) of the handlebar (60) to the rod (41) of the front fork (40) consists of a tongue (54) fixed to the column (50) at a certain distance from the lower hinge (53), that can be connected to a square (46) fixed to the upper rod (51) of the front fork (50) by a screw (48) and a wing nut (49).

7. A bicycle as defined in claim 1, wherein the device (25) for locking and articulating the bracket (43) on the tube (42) of the fork (40) of the front wheel (11) on the frame (20) comprises a substantially horizontal fork (27) facing toward the front wheel (11) and provided with two parallel holes, one hole for the articulation (28) between the fork (47) and the bracket (43) and the other hole to receive a screw (29) through a hole (30) in the bracket (43) so that a wing nut (31) tightening the screw (29) locks the whole in a riding position.

8. A bicycle as defined in claim 1, wherein the device (105) for locking the tube (100) that supports the sliding rod (101) carrying the saddle (13) consists of a half ring (102) with a perforated tongue and a transversel screw (104) with a wing nut (103) to tighten the half ring (102) and therefore to lock the rod (101) in two positions, one position of maximum extension while in use and the other position of maximum compression for transport, being applied to the screw a perforated tongue (106) placed at an end of the tie rod (107) of the saddle (13) that slides into the tubular extension (23') of the right arm (23) of the frame (20) so that by locking the device (105) a position of the rod (107) is also locked in its position of use with maximum extension, or in its position of transport with maximum compression, as a rotation of the tube (100) on its articulation (33) at the lower end (24) of the frame (20) determines a rotation of the perforated tongue (106) associated to the locking device (105) and housing a screw (104) with the wing nut (103), so that by locking the rotation, both the tire rod (107) of the saddle (13) and the tube (100) are also locked in their relative positions.

9. A bicycle as defined in claim 1, wherein the device (115) for locking the pin (112) of the pedal (111) on a left pedal crank (113) in two positions, for use and for transport, consists of a bar (116) fixed to the pin (112), free to rotate longitudinally inside the pedal crank (114) and through which passes transversely a pin (117), served by a spring, that can penetrate as desired in one or another of transversel holes in the bar (116), corresponding to the position of the pin (112) of the pedal (111) respectively orthogonal to the pedal crank (114) or on the same plane as the crank.

10. A bicycle as defined in claim 1, wherein the bulk of the bicycle is substantially comprised within a parallelopiped dimensions of which are 40×50×20 cm, if a diameter of the wheels (11, 12) is 40 cm, or is comprised within a parallelopiped with dimensions of which are 50×, 60, 20 cm, if a diameter of the wheels (11,12) is 50 cm.

11. A bicycle as defined in claim 1, wherein inside the lateral extension (24) of the right arm (23) of the frame (20) there is a cylindrical helical compression spring (145) at whose base there is a plate (150) welded to an end of an extension (24) through which passes a metal wire (146) associated above to an upper head (148) of the spring (145) and emerging freely below from a hole (152) in the plate (150), then becoming associated to a clamp (151) placed on one arm of the rear fork (80) close to its articulation (34) with the frame (20), said spring (145) being so loaded as to contribute to balancing the rear fork (80) together with the rear wheel (12).

12. A bicycle as defined in claim 1, wherein the wire (146) associated to the head (148) of the spring (145) on emerging from the head (148) passes through a lateral hole (144) that connects the right arm (23) of the frame (20) to its extension (24) and becomes associated to a clamp (147) placed substantially at a tip of the rod (147) of the saddle (13) of the right arm (23) of the frame (20), said wire (146) becoming extended at synergy with the spring (145) contributing to balancing the rear fork (80) and ensuring its stability in the folded position with the rear wheel (12) substantially inserted within the frame (20).

13. A bicycle as defined in claim 2, wherein a cylindrical helical compression spring (155) is placed at the end (22') of the left arm (22) of the frame (20), said spring (155) making contact with a plate (154) welded at an end of an arm (22') close to the articulation (38) of the bar (90) that carries the pedal unit (110), and having at its upper end a head (158) with a clamp (159) to which it is associated a metal wire (156) that, passing through the spring (155) and emerging freely from a central hole (160) in the plate (154), becomes associated to a clamp (157) placed on the bar (90) carrying the pedal unit (110) close to its articulation (38) on the extension (22') of the frame (20) contributing to balancing the pedal unit (110) complete with the gear (14) and a chain.

14. A bicycle as defined in claim 1, wherein the rod (63) of the handle bar (60) houses within it a cylindrical helical compression spring (135) that makes contact uppermost on a plate (140) welded substantially at an upper end of the rod (63), a metal wire (136) being associated to a clamp (139) on a lower hand (138) of the spring (135) that passes through the spring and emerges freely from a central hole of the plate (140), from where it becomes associated through a hole (147) to the central cross-piece (70) of the handle bar (60) so that when the handle bar is rotated to fall the bicycle (10) from its position of use to its position from transport the wire (136) is pulled and compresses the spring (135) that balances the weight of the handle bar.

15. A bicycle as defined in claim 1, wherein at a lower end of the steering column (50) of the handle bar (60) there is a cylindrical compression spring (125) that substantially makes contact with the lower end of the column (50) and with a plate (51) that connects it to a hinge (53) supported by a bracket (52) fixed to the front fork (40) of the bicycle (10), the spring (125) having uppermost a head (128) with a clamp (129) to which is associated a wire (126) that, passing along the spring, emerges freely through a hole (130) made in the plate (51) and becomes associated to a clamp (127) placed substantially in a center of the bracket (52) so that when the steering column (50) of the handle bar (60) is bent against the front wheel (11) in a position for transporting the bicycle (10), the helical spring (125) becomes compressed due to its being pulled by the wire (126) so balancing the weight of the column (50) and on the handle bar (60).

16. A bicycle as defined in claim 1, wherein the device placed at an end of a left pedal crank (165) or, when prepared for transport on a same geometrical plane as that of the pedal crank (165), consists of a configuration of an end of the pedal crank (165) that comprises, in an outward sequence, a length of a constant square cross-section (168) a collar (169), a terminal length of a constant square cross-section (166) and a locking washer (170) applied to a front of the end (168) of the pedal crank (165) by a screw (172), a diameter of the washer being greater than dimensions of a cross-section of the pedal crank (165), sides of the lengths (166, 168) of a square cross-section and a diameter of the collar (169) being substantially equal, a head (175) for association to the pedal crank (165) being placed at an end of a pin (174) in a pedal (177), the head consisting of a square ring whose initial dimensions substantially correspond to those of the end lengths (166, 168) of the pedal crank (165), permitting the head (175) to slide freely, a ring nut (180) being placed on the end length (166, 168) of the pedal crank (165), there being in the ring nut a central hole (181) of a constant square section whose dimensions substantially correspond to those of the end lengths (166, 168) of the pedal crank (165), an elastic metal U-shaped fork (185) being placed diagonally at one corner one (190) of the hole (181) in the ring nut (180), the fork having arms (184) fixed securely on extension (188, 189) placed substantially central in sides of the corner (190) of the hole (181), a central plate (187) of the fork cutting the corners so that the ring (175) of the pin (174) in the pedal (177) can be placed on the square-section end (168) of the pedal crank (165), in the position for use with the pin (174) orthogonal to an axis of the pedal crank (165) and a position of the ring nut corresponding to that of the collar (169), and being possible for the ring nut (180) to move spontaneously toward the square area (166) inside the pedal crank (165) as the fork (185), placed diagonally to the one corner (190) of the hole (181) in the ring nut (180), spontaneously moves to one side (166') of the area (166) of the pedal crank (165) causing the square (181) in the ring nut (180) to be out of line with the square body (166) of the end of the pedal crank (165), a consequence of this being that the pedal (177) remains locked in its positional use while, when the pedal (177) has to be moved to its position for transport, the elastic fork quality can be pressed by hand so as to free the corner (190) in the square hole (181) in the fork (185) on which it interferes, cause the ring nut (180) to move inside the pedal crank (165) so that it coincides with the square section length (166) permitting the ring (175) of the pin (174) in the pedal (177) to pass a position of the collar (169) and to rotate to assume a position substantially corresponding to the geometrical plane of the pedal crank (165) followed by its movement to a position on the square section end (168) of the pedal crank (165) leaving the ring nut (180) free to resume its position on the collar (169) and then to rotate freely so as to interfere to the elastic fork (185), with the corner (190) of the hole (181), the sides (166') of the square cross section end (166) of the pedal crank (165) then locking the pedal (177) in a position for transporting the bicycle (10).

* * * * *